(12) United States Patent
Plante (10) Patent No.: US 7,089,881 B2
(45) Date of Patent: Aug. 15, 2006

(54) PET DRINKING FOUNTAIN

(75) Inventor: Robin Plante, Sainte-Barbe (CA)

(73) Assignee: Rolf C. Hagen, Inc., Montreal (CA)

( * ) Notice: Subject to any disclaimer, the term of this patent is extended or adjusted under 35 U.S.C. 154(b) by 83 days.

(21) Appl. No.: 10/757,100

(22) Filed: Jan. 14, 2004

(65) Prior Publication Data

US 2005/0166853 A1  Aug. 4, 2005

(51) Int. Cl.
*A01K 7/02* (2006.01)

(52) U.S. Cl. ....................................................... 119/74

(58) Field of Classification Search ............ 119/51.01, 119/51.5, 72, 74, 77, 78, 79, 80; 239/23; D30/121, 129, 130, 131, 132, 133
See application file for complete search history.

(56) References Cited

U.S. PATENT DOCUMENTS

| | | | |
|---|---|---|---|
| 1,158,676 A | 11/1915 | Furber | |
| 1,278,285 A | 9/1918 | Allen | |
| 1,326,778 A | 12/1919 | Paulsen | |
| 1,481,365 A | 1/1924 | Hegel | |
| 2,034,968 A | 3/1936 | Bartlett | |
| 2,366,766 A | 1/1945 | Brodsky | |
| 2,510,252 A | 6/1950 | Pine | |
| 2,618,237 A | 11/1952 | McDermott et al. | |
| 2,678,630 A | 5/1954 | Frederiksen | |
| 2,699,752 A | 1/1955 | Reyes | |
| 2,702,528 A | 2/1955 | Lehmann | |
| 2,726,636 A | 12/1955 | Frederiksen | |
| 2,775,227 A | 12/1956 | Millies | |
| 2,877,051 A | 3/1959 | Cushman et al. | |
| 2,878,781 A | 3/1959 | Wingfield | |
| 3,179,085 A | 4/1965 | McKillip, Jr. | |
| 3,228,377 A | 1/1966 | Grassano | |
| 3,272,181 A | 9/1966 | Ramsey | |
| 3,409,223 A | 11/1968 | Gosh | |
| 3,459,159 A | 8/1969 | Reed | |
| 3,505,978 A | 4/1970 | Nilsen | |
| 3,537,430 A | 11/1970 | Peppler | |
| 3,590,857 A | 7/1971 | Gruett | |
| 3,699,921 A | 10/1972 | Janicek | |
| 3,730,141 A | 5/1973 | Manning et al. | |
| 3,759,228 A | 9/1973 | Keen | |
| 3,771,496 A | 11/1973 | Atchley | |
| 3,777,714 A | 12/1973 | Danielsson | |
| 3,804,064 A | 4/1974 | Kuneman et al. | |
| 3,831,558 A | 8/1974 | Forbes | |
| 3,866,576 A | 2/1975 | Downing | |
| 3,868,926 A | 3/1975 | Olde | |
| 3,901,191 A | 8/1975 | Smith | |
| 3,901,439 A | 8/1975 | Willis | |

(Continued)

*Primary Examiner*—T. Nguyen
(74) *Attorney, Agent, or Firm*—Wolf Greenfield & Sacks PC (57) ABSTRACT

A pet drinking fountain includes a base having a well housing a water filter and pump. A water tank is mounted on the base, and a drinking dish is disposed beside the tank. The dish communicates with the well in the base allowing water to flow from the it to the well. A duct extends from the pump upward through the tank and discharges water onto the outer surface of the tank from which the water flows into the bowl. The pet can drink from the dish or lap water flowing down the tank surface. When the level of water in the well falls below a prescribed level, water from the tank is discharged into the well. A food dish may also be added to the structure.

32 Claims, 5 Drawing Sheets

U.S. PATENT DOCUMENTS

| | | |
|---|---|---|
| 3,903,845 A | 9/1975 | Little |
| 3,921,902 A | 11/1975 | Erickson et al. |
| 3,946,701 A | 3/1976 | Hostetler |
| 4,022,159 A | 5/1977 | Salvia |
| 4,034,715 A | 7/1977 | Arner |
| 4,098,229 A | 7/1978 | Haynes et al. |
| 4,158,427 A | 6/1979 | Hegge |
| 4,248,177 A | 2/1981 | Peterson et al. |
| 4,347,809 A | 9/1982 | Gloggler |
| 4,351,270 A | 9/1982 | Sabin |
| 4,386,582 A | 6/1983 | Adsit |
| 4,469,049 A | 9/1984 | Waynick |
| 4,559,905 A | 12/1985 | Ahrens |
| 4,573,433 A | 3/1986 | Thompson |
| 4,584,966 A | 4/1986 | Moore |
| 4,721,063 A | 1/1988 | Atchley |
| 4,747,538 A | 5/1988 | Dunn et al. |
| 4,807,565 A | 2/1989 | Hawthorne |
| D300,277 S * | 3/1989 | Clark ................ D30/122 |
| 4,819,874 A | 4/1989 | Geiger |
| 4,836,142 A | 6/1989 | Duback |
| 4,840,143 A | 6/1989 | Simon |
| 4,844,014 A | 7/1989 | Gershman |
| 4,924,812 A | 5/1990 | Bernays, Jr. |
| 4,976,220 A | 12/1990 | Gershman |
| D315,037 S | 2/1991 | Clark |
| 5,112,263 A | 5/1992 | Penillard et al. |
| 5,167,368 A | 12/1992 | Nash |
| 5,207,182 A | 5/1993 | Lorenzana |
| 5,259,336 A * | 11/1993 | Clark ................ 119/51.5 |
| D343,442 S | 1/1994 | Cooper |
| 5,326,032 A | 7/1994 | Quillin |
| 5,329,876 A | 7/1994 | Tracy |
| D350,842 S | 9/1994 | VanSkiver |
| D367,735 S | 3/1996 | VanSkiver et al. |
| D368,120 S | 3/1996 | Hamlin |
| 5,501,178 A | 3/1996 | Kemp |
| D378,773 S | 4/1997 | Wood |
| 5,687,783 A | 11/1997 | Finnegan |
| 5,799,609 A | 9/1998 | Burns et al. |
| 5,809,934 A | 9/1998 | Gavet |
| 5,842,437 A | 12/1998 | Burns |
| 5,845,605 A | 12/1998 | Malamphy |
| D406,926 S | 3/1999 | Kolozsvari |
| 5,918,415 A | 7/1999 | Locke et al. |
| 5,966,868 A | 10/1999 | Cox |
| 6,055,934 A | 5/2000 | Burns et al. |
| 6,079,361 A | 6/2000 | Bowell et al. |
| D428,217 S | 7/2000 | Rodack et al. |
| 6,101,974 A | 8/2000 | Frohlich |
| 6,142,101 A | 11/2000 | Pelsor |
| 6,148,767 A | 11/2000 | Manchess |
| 6,149,070 A | 11/2000 | Hones |
| 6,149,991 A | 11/2000 | Okuda |
| 6,152,381 A | 11/2000 | Hones |
| 6,206,298 B1 | 3/2001 | Ting |
| 6,209,797 B1 | 4/2001 | Jenney |
| 6,257,560 B1 | 7/2001 | Kim |
| 6,276,299 B1 | 8/2001 | Firstbrook |
| 6,347,750 B1 | 2/2002 | Delettre |
| D456,569 S | 4/2002 | Northrop |
| D457,692 S | 5/2002 | Skurdalsvold et al. |
| 6,405,937 B1 | 6/2002 | Stukenberg |
| 6,460,483 B1 | 10/2002 | Northrop et al. |
| D497,041 S * | 10/2004 | Plante ................ D30/130 |

* cited by examiner

PET DRINKING FOUNTAIN

BACKGROUND OF INVENTION

1. Field of Invention

This invention relates to drinking and feeding apparatus for pets and more particularly to a drinking fountain that provides continuously running water and that offers a large descending surface and a bowl as alternate drinking sites for the pet.

It has long been recognized that pets, and particularly cats, prefer to drink running water as opposed to still or stagnant water and examples of devices that provides running drinking water for pets is well represented in the patent literature including the following: U.S. Pat. Nos. 5,799,609; 5,842,437; 6,055,934; 5,501,178; and 4,976,220. Many of the prior art devices have limited capacity, are inconvenient to fill and afford limited drinking space for the pets. The purpose of the present invention is to overcome the many limitations of the prior art by providing apparatus that is easy to maintain and operate, is easy to clean, and provides the most appealing drinking facilities for a pet.

SUMMARY OF INVENTION

In accordance with one aspect of the present invention, a large reservoir is provided having an extensive surface over which water circulates to a drinking bowl, affording the pet the ability to drink either from the running water on the surface of the tank or from the bowl to which the water flows from the surface, the water in the bowl itself being continuously in motion as well.

In accordance with another aspect of the present invention, the water reservoir or tank is dome shaped and the large surface serves not only as a large drinking surface for the pet, but also provides a large surface for oxygenation of the water circulating between the bowl and the surface.

In accordance with another aspect of the invention, the water in the tank automatically enters the water circulation system when the flowing water falls below a prescribed level. The capacity of the tank may be as much as three liters or more so as to eliminate the need for frequent refilling and the possibility that the system will run dry.

In accordance with another aspect of the present invention the tank is disposed on a base having a well below the tank. Water in the well passes through a filter and thereafter is pumped up a duct that extends through the tank, and the water spills out of the top of the duct onto its surface. The water then flows down the surface of the tank and a portion of the water flows directly into the bowl which is beside the tank. The rest of the water flowing down the surface of the tank is collected in a gutter that directs it into the bowl. In the preferred embodiment the gutter is inclined to cause the water to flow in one direction and thereafter circulation in the bowl so as to avoid stagnation.

In accordance with yet another aspect of the present invention, the surface of the bowl has a number of dome-like areas that cause water entering the bowl to circulate in it before flowing into the well beneath the tank.

In accordance with yet another aspect of the present invention, the tank has a convenient handle attached to the duct so that the tank may be lifted from the base and carried to a source of water where it may easily be refilled.

In accordance with another aspect of the present invention, a dish is removably attached to the drinking bowl. The dish is designed to hold any food (or drink) suitable for the pet. When connected to the assembly, the bowls, dish, and base and tank assembly provide a unified structure.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

The pet drinking fountain of the present invention includes in its general organization, a base 20, a tank assembly 22, a food dish 24, a filter 26, and a pump 28. The base 20 includes a tank receptacle 30 and a drinking bowl 32.

Figure 1:
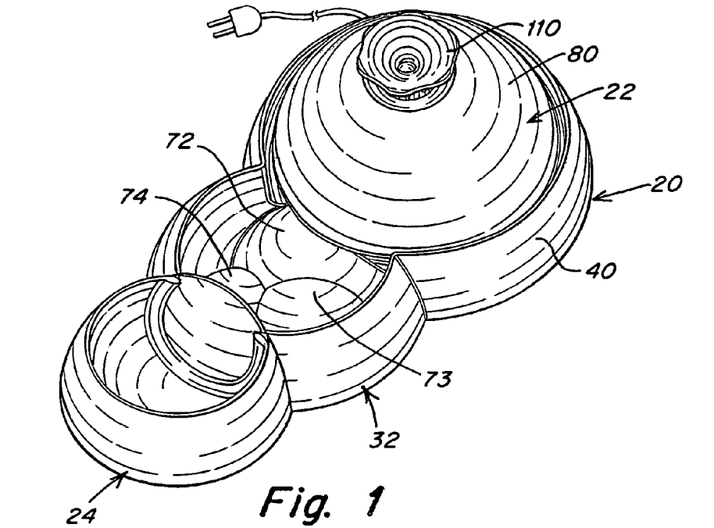
FIG. 1 is a perspective view of a pet drinking fountain embodying the invention.
Figure 2:
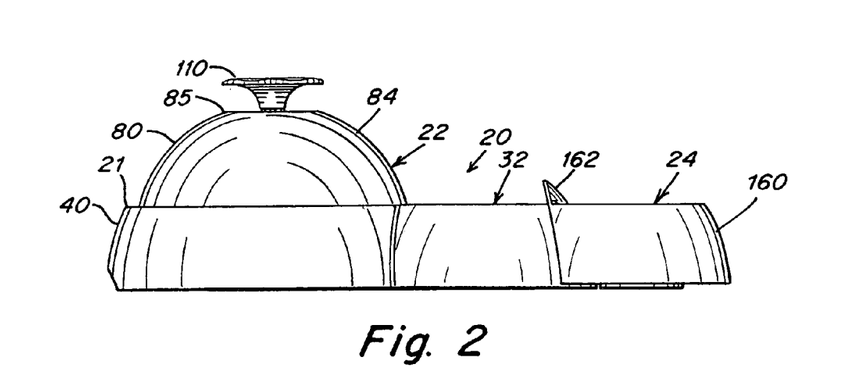
FIGS. 2 and 3 are side and top views of the embodiment shown in FIG. 1 with FIG. 3 suggesting the flow of water in the system.
Figure 3:
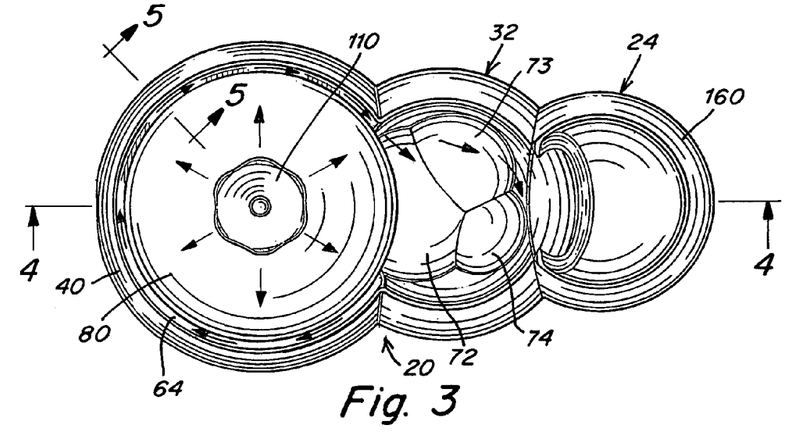
Figures 4, 4A:
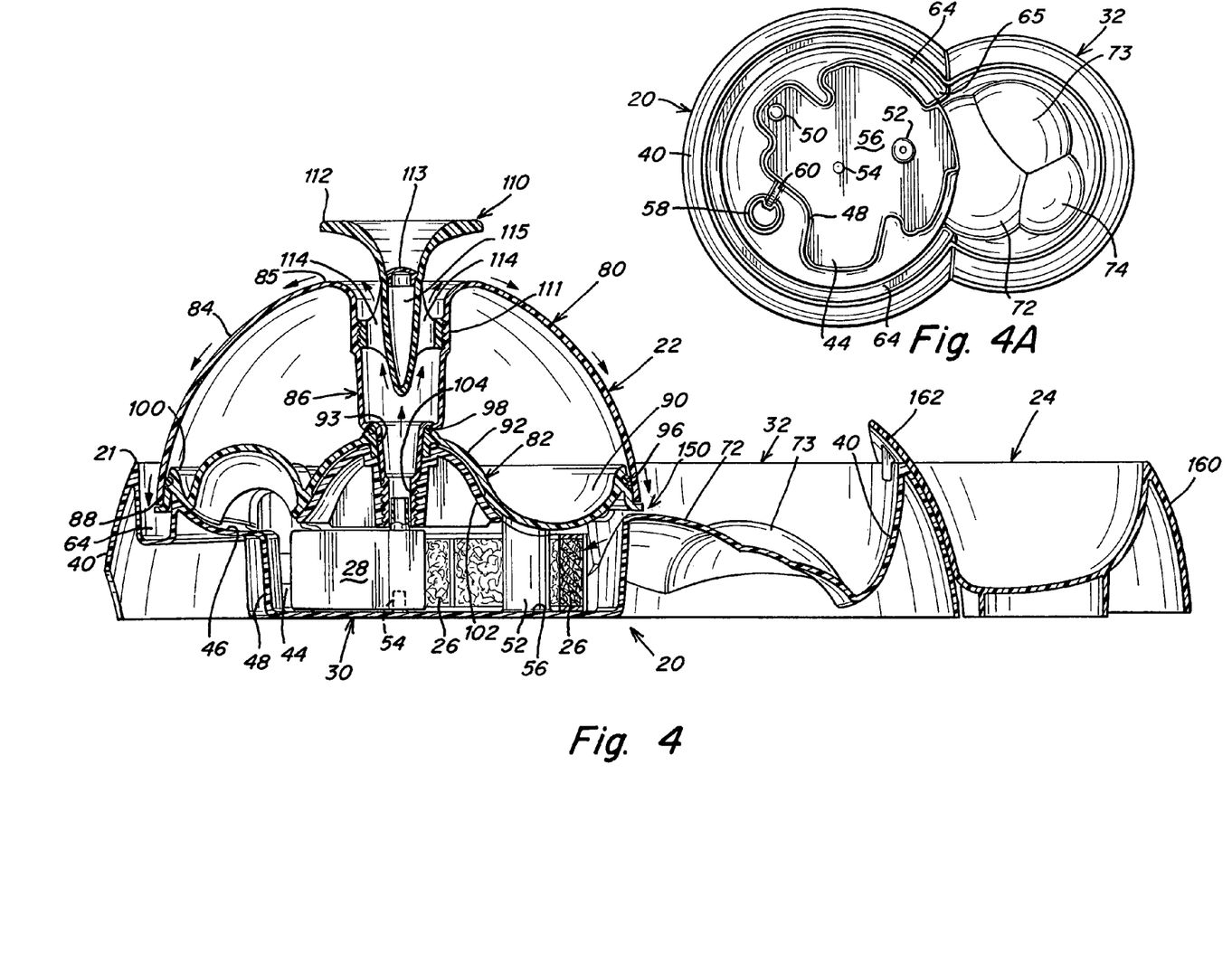
FIG. 4 is a cross-sectional view of the fountain taken along the section line 4—4 in FIG. 3.
FIG. 4A is a top plan view of the base of the drinking fountain with the food dish removed.

The pet drinking fountain shown in detail in FIG. 4 preferably provides continuously flowing water and the circulating water in the system may be replenished from a reservoir in the tank 22 that furnishes the additional water on demand. In use, water is ordinarily consumed by the pet from the bowl 32 where the water is continuously moving, and the water is drawn into the base 20 from the bowl where it is filtered and then pumped through a duct or standpipe 86 to the top of the dome 80 of the tank assembly 22 and spills out over the surface thereof and flows either directly from the dome surface 84 into the bowl 32 or indirectly to the bowl after being collected in the gutter 64 of the base 20 that surrounds the dome of the tank and empties into the bowl. When the water in the base falls below a certain level, an opening in the bottom of the tank assembly will automatically enable water to flow from the interior of the tank into the circulating water system to return the water in the bowl to a prescribed level. Separately, food may be fed to the pet by placing it in the food dish 24 which preferably is detachable from the base 20 so that it may conveniently be washed or filled with food. The various aspects of this invention will be more fully appreciated from a reading of the following detailed description with reference to the accompanying drawings.

Figure 8:
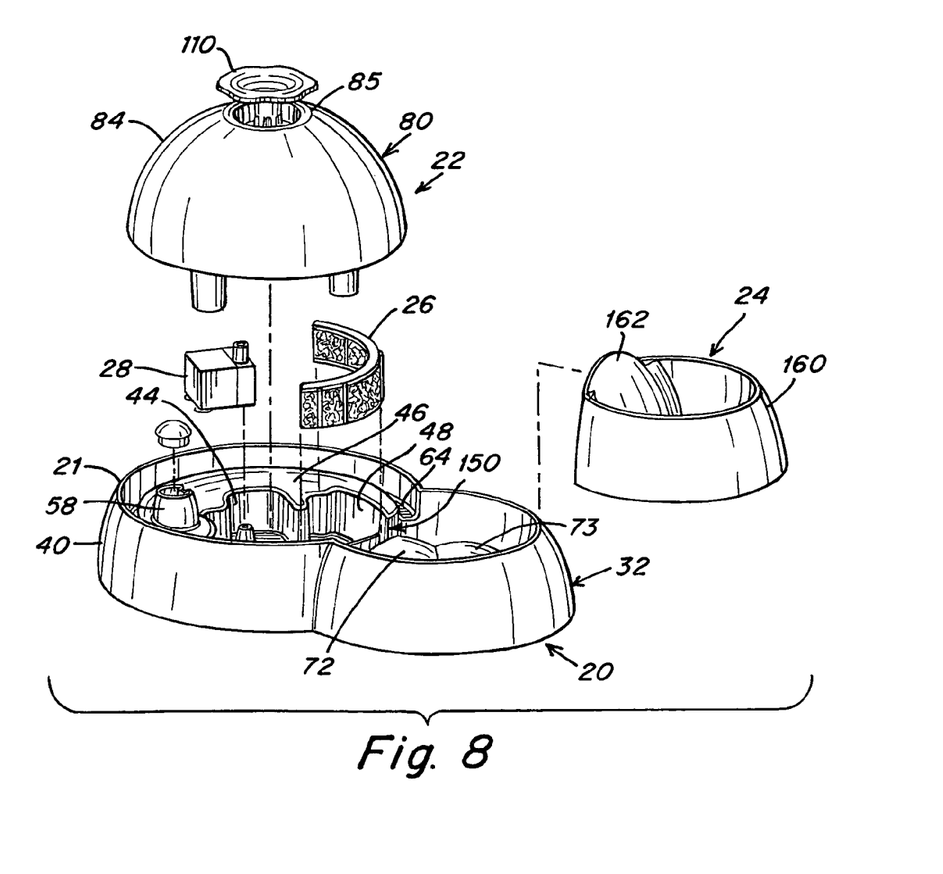
FIG. 8 is an exploded view of the drinking fountain.

The base 20 shown in detail in FIGS. 4 and 4A includes a peripheral wall 40 that encircles both the tank receptacle 30 and the drinking bowl 32. The two sections of the base, namely the portion that supports the tank assembly 22 and the bowl 32 are preferably formed as a unitized structure. While the receptacle 30 and bowl 32 are shown integrally formed, it should be appreciated that they may be separately formed and linked together by a bracket, fastener or some other device. The receptacle 30, as shown FIGS. 4 and 8, has a central well 44 and an elevated peripheral portion 46. The peripheral portion 46 is bowed to provide a seat for the tank assembly 22, and the deeper well portion 44 defined by the irregular side wall 48 houses the water filter 26 and pump 28. In FIG. 4A three projections or posts 50, 52, and 54 are shown formed in the lower surface 56 of the well 44, which respectively serve, as follows: post 50 opens a valve that controls the flow of water from the tank when the tank is removed from the base; the post 52 serves to orient the tank assembly on the base 20; and the post 54 positions the pump 28 in the well 44. These features are described in greater detail below. On the elevated portion 46 of the tank receptacle, a sleeve 58 which passes through the lower surface of the base, receives a power cord (not shown) for energizing the pump 28. A channel 60 extends from the sleeve 58 to the wall 48 to permit the power cord to enter the well 44 of the tank receptacle and connect to the pump 28. The channel 60 preferably includes a cover (not shown) to enclose the power cord and prevent any water in the well 44 from dripping through the sleeve 58 to the surface on which the water fountain rests. A gutter 64 provided about the periphery of the tank receptacle 30 just inside the peripheral wall 40 is designed to carry water that flows down the surface of the tank assembly into the drinking bowl 32. The elevation of the gutter channel decreases in a clockwise direction as viewed in FIG. 4A causing water in the gutter to flow to the gutter lower end 65 and into the drinking bowl 32 to avoid stagnation.

The upper edge of the sleeve 58 preferably is slightly higher (for example 2 mm) than the edge 21 of the base to prevent water in the base from flowing unnoticed, from the base through the power end sleeve to the surface on which the drinking fountain rests. If the base is filled to overflowing, the water will run over the edge 21 which would be clearly visible to anyone in attendance. Moreover, the fountain is designed so that the full capacity of the tank 22 does not exceed that of the base. Accordingly, if the tank develops a leak, the water will drain completely into the base but will not spill down through the sleeve to the surface supporting the fountain and go undetected.

The bowl 32 preferably has a number of bumps 72, 73 and 74 in its lower surface. The bumps serve several functions. One desirable function is that they avoid water stagnation in the bowl 32 by causing water that flows into it from the gutter 64 to flows over and around the bumps. Also, the bumps create different water levels in the bowl enabling the animal to choose a preferred drinking condition, that is, water that flows from the gutter 64 onto the larger bump 72 forms a thin film of water and the other bumps 73 and 74 have greater depths of water on their curved surfaces so as to provide a choice for the animal. The irregular surface created by the bumps also simulates a natural water source that provides different water depths. It should also be noted that a portion of the water flowing down the surface of the tank assembly adjacent the bowl flows directly into the bowl 32 onto the largest bump 72 by virtue of the interruption of the gutter 64 shown at 65 on the sides of the tank assembly 22 immediately adjacent the bowl.

The tank assembly 22 includes the dome 80 and a bottom cover 82 that together define a closed tank for holding water. The water within the tank, as explained more fully below, is drawn into the continuous flow of water that circulates over the surface 84 of the dome, into the bowl 32 and well 44, through the filter 26 and pump 28, and upwardly through the duct 86 that extends through the tank.

The dome 80 in the embodiment illustrated is generally hemispherically shaped and the duct 86 formed as an integral part thereof extends downwardly from the upper surface 85 to a point slightly below the bottom peripheral edge 88. The bottom cover 82 has a peripheral trough 90 and a central hump 92, and the hump 92 has an opening 93 at its center through which the duct 86 extends when the dome and bottom cover are assembled together. Gaskets 96 and 98 form seals at the mating portions of the dome and bottom cover, both at the edge 88 of the dome 80 where it engages the periphery 100 of the bottom cover 82 and at the central opening 94 where it engages the duct 86. A retainer 102 is threaded onto the lower threaded end 104 of the duct 86 so as to hold the dome and bottom cover in assembled relationship. It will be noted in FIG. 4 that the trough-shaped portion 90 of the bottom cover mates with the curved portion 46 of the tank receptacle so as to form a firm seat for the tank assembly 22. The retainer 102 also conforms to the shape of the hump 92 in the bottom cover.

Figure 9:
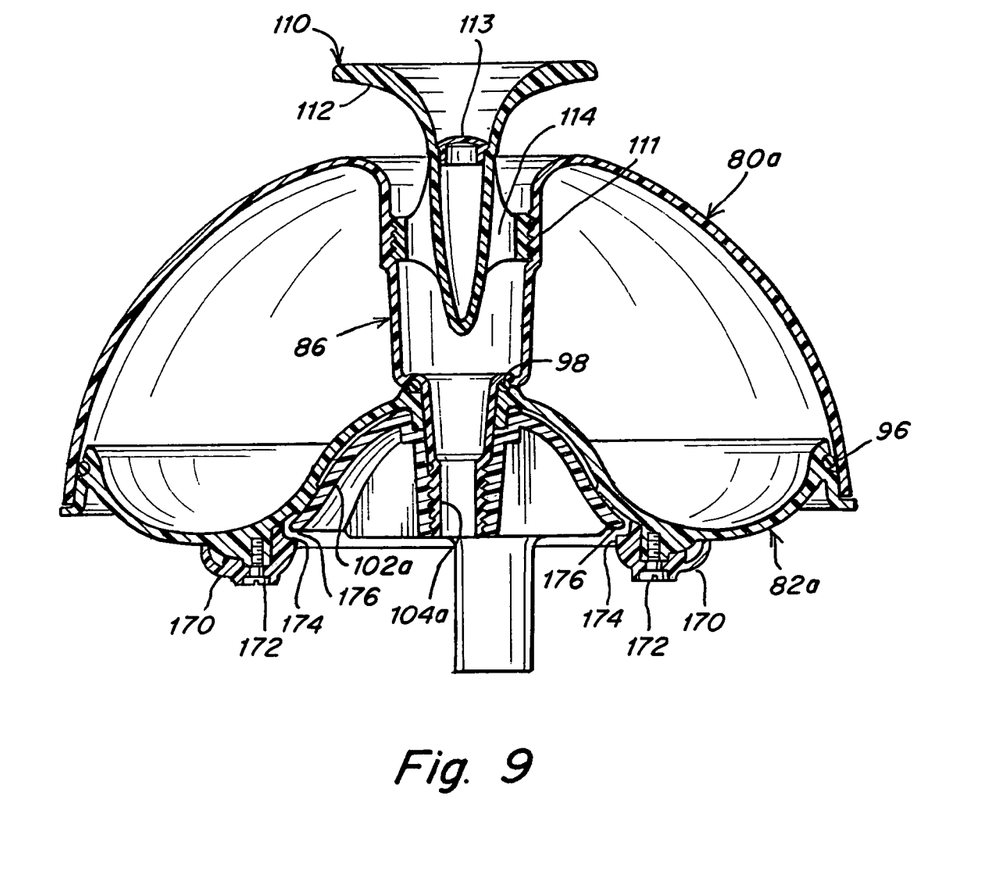
FIG. 9 is a fragmentary cross-sectional view of another embodiment of the dome and bottom cover.

In accordance with another aspect of this invention shown in FIG. 9, means may be provided to assist in separating the dome 80a from the bottom cover 82a, which in some instances may be impeded by the seal formed by the gaskets 96 an 98. In accordance with the embodiment of FIG. 9, the means comprises a device for preventing separation of the retainer 102a from the bottom cover 82a so that when the retainer is rotated, the mating threaded parts of the retainer and duct 104a will force relative axial movement of the dome and bottom cover. In the specific arrangement shown, a pair of extractors 170 are secured to the bottom side of the bottom cover 82a approximately diametrically opposite one another, by screws 172. Preferably the extractors are permanently secured to the bottom cover 82a, and other types of fasteners may be employed for that purpose as well. The extractors 170 have flanges 174 that overlap the bottom edge 176 of the retainer so that the retainer is afforded limited axial movement on the bottom cover. This enables the retainer to turn freely on the cover so that it can draw the duct 104a of dome 80a tightly against the cover to form seals at the gaskets. When the retainer is turned in the opposite direction, the duct 104a will be forced axially away from the bottom cover and break the seals formed by the gaskets 96 and 98.

It will be appreciated that other arrangements may be used to accomplish the same purpose within the scope of this invention.

The tank assembly 22 formed by the dome 80 and bottom cover 82 has a handle 110 that threads into the top portion 111 of the duct 86 to facilitate carrying the tank. The handle includes a gripping portion 112 and a number of passages 114, the passages allowing water pumped up the duct 86 to pass through the handle and spill onto the surface 84 of the dome. In a preferred form of the invention, the top of the handle may have a flower configuration to enhance the design of the device, and a stopper 113 is threaded into the handle to close its central cavity 115. The handle may, of course, take other forms. The handle also serves as a stand for the dome 80 when the dome is removed from the base, inverted and detached from the bottom cover for filing, cleaning or other purpose.

Figure 5:
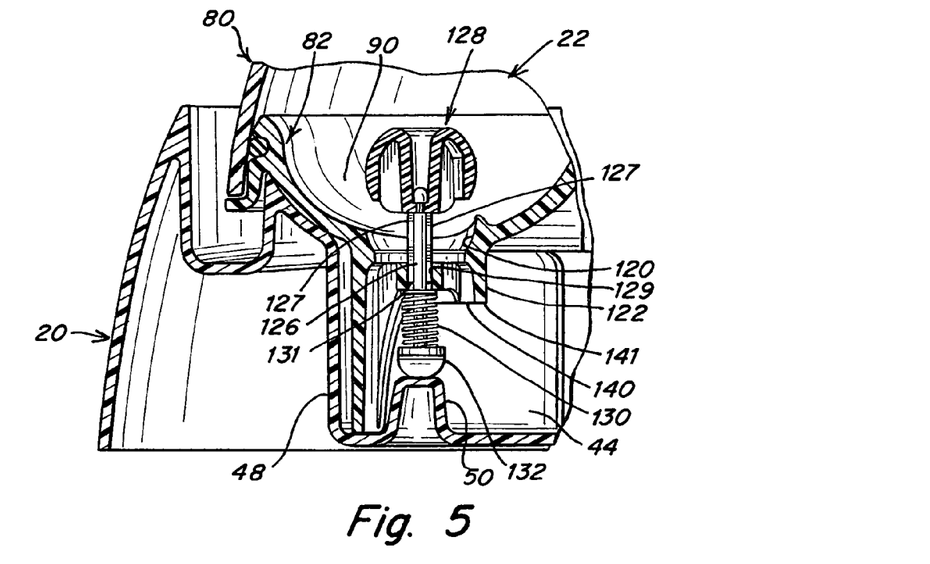
FIG. 5 is a fragmentary cross-sectional view of the stem valve, dome, bottom cover of the dome and the base, showing the valve in the open position and taken along section line 5—5 in FIG. 3.
Figure 6:
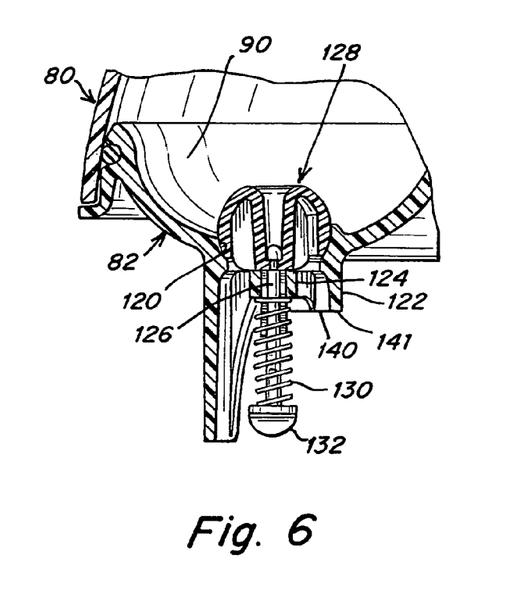
FIGS. 6 and 7 are views similar to FIG. 5 and with the valve shown in the closed and open locked positions, respectively.
Figure 7:
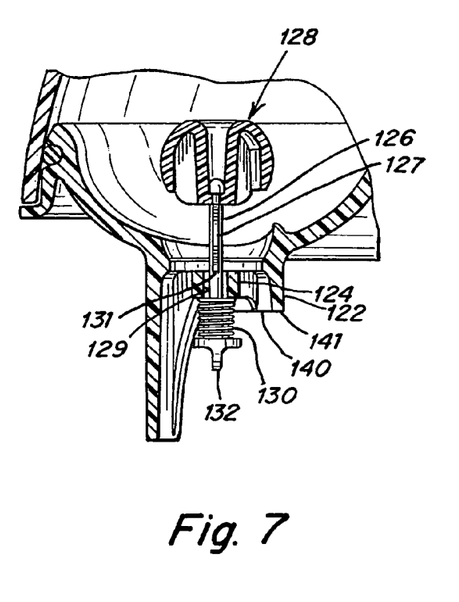
Figure 7A:
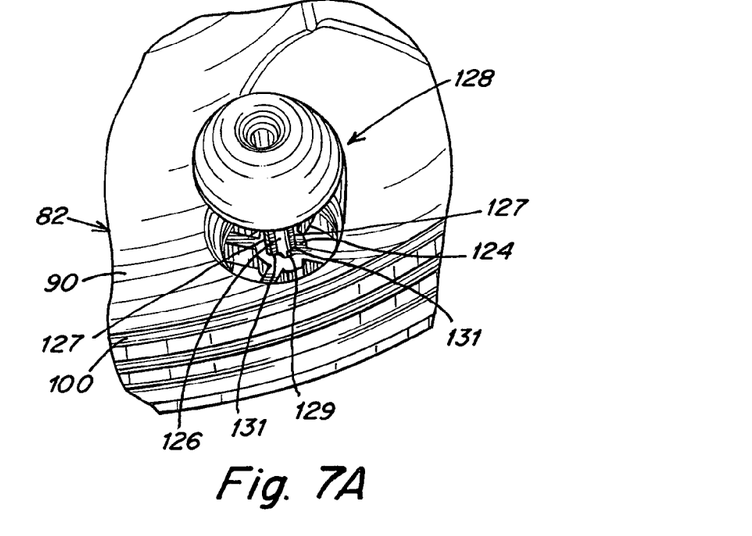
FIG. 7A is a fragmentary perspective view of the valve disposed in the open position.

The bottom cover 82 in the lower surface of the trough 90 includes a passage 120 (see FIGS. 5–7) surrounded by a collar 122 that includes a frame 124 for supporting the stem 126 of valve 128 that controls the flow of water from the tank through the opening 120. The valve 128 is biased to the closed position shown in FIG. 6 by a coil spring 130 carried on the valve stem 126 and bearing against the stem head 132 and the frame 124. The spring biases the valve 128 to the closed position but is automatically moved to the open position shown in FIG. 5 when the tank assembly 22 is placed on the base. The valve is opened by virtue of the stem head 132 engaging the post 50 in the well 44 of the base when the tank assembly is placed on the tank receptacle 30. When the tank assembly for any reason is removed from the base 20, the valve automatically closes so as to prevent water in the tank from flowing out opening 120. In FIG. 7 the valve 128 is shown in the locked open position, that is, the valve is raised off the valve seat defined at the opening 120 without support from an external force. This is achieved by manually moving the valve to the open position and thereafter rotating the stem 126 90° as suggested in FIG. 7A so that the ribs 127 on opposite sides of the stem are misaligned with the slots 129 in the frame 124 and the lower ends 131 of the ribs engage the top of the frame. To release the valve 128 to the bias imposed by the spring 130, the valve is rotated 90° back to the position of FIG. 6 to align the ribs 127 with the slots 129, and the valve will close unless movement of the stem is impeded as shown in FIG. 5. Other expedients as well may be used to hold the valve open, such as detents, clamps, spring loaded pins, etc.

When the tank assembly 22 is positioned on the base, the valve 128 opens automatically so as to allow water in the tank to flow into the well 44 in the base 20, should the level of the water in the well fall below a predetermined level as described more fully below. The water chamber in the tank assembly is sealed as there are no openings in the dome surface to permit air to enter that space. However, when the level of water in the well drops below the height of the highest point of the lower edge 140 of the collar 122 (at point 141 as indicated in FIGS. 5–7), water in the tank will flow through the opening 120 and cause the well 44 to fill to a height above the edge 140. It will be appreciated that the surface of the water in the well 44 is exposed to ambient pressure, and when the water rises above point 141 to seal the opening 120, flow of water from the tank to the well will cease as the pressure above the water in the tank equalizes with ambient pressure.

The tank may be periodically filled simply by removing it from the base with the aid of the handle 110 and removing the retainer 102 from the end 104 of the duct 86 so that the bottom cover 82 may be separated from the dome 80. After the dome is filled with water, the bottom cover 82 is replaced, the retainer 102 attached, and the inverted tank may be inverted (without fear of leakage because the valve assembly 128 is closed) and placed on the base 20. The break in the gutter allows water in the bowl 32 to flow into the well 44 in the tank receptacle portion of the base. The passage is shown at 150 in FIG. 4. Water entering the well flows through the filter 26 before reaching the pump 28. The water is continuously circulated by the pump 28 up the duct 86 and down the surface 84 of the dome 80 with a portion of that water flowing directly into the bowl and the rest of the water being directed to the bowl via the gutter 64. That circulation is continuous and when enough water is consumed (or evaporates) to reduce the level of water in the well so as to expose the top most portion 141 of the bottom 140 of collar 122, air will bubble upwardly in the tank and water inside the tank will flow out the opening 120 and replace the water either consumed, evaporated or otherwise removed from the system until the bottom of the collar is fully submerged in the well.

It should also be noted in FIG. 4 that the portion of the lower edge of the dome 80 and the periphery of the bottom cover 82 that are aligned with the gap 150 are spaced from a bottom surface of the bowl 32 and more particularly the bump 72, and therefore, no seal is formed that precludes the free flow of water from the bowl to the well.

As another aspect of the present invention, a separate food dish 24 is provided, preferably removably attached to the base 20. The dish 24 is principally provided as a feeding dish for solids, although it may be used for other purposes. In the embodiment shown, the dish 24 has a peripheral wall 160 of essentially the same height as the side wall 40 of the base 20 and has a hook like segment 162 on one side that hooks over the top edge of the bowl 32. That segment 162 of the dish wall 160 that hooks over the edge of the side wall 40 of the base may also serve as a baffle to prevent solids in the dish 24 from falling into the bowl 32. It also serves as a handle for carrying the dish. The drinking fountain may, of course, be used with or without the food dish 24.

In the embodiment illustrated, the surface 84 of the dome 80 is smooth and causes water to flow smoothly down its surface. The surface, however, may be textured or be provided with a special shape to simulate a rock or other mass commonly found in streams of flowing water.

In the preferred embodiment the base 20 may be molded of a plastic material such as polystyrene, but it may be made of other materials such as ABS, polypropylene, polyethylene, polycarbonate, etc. Similarly, the dome 80 and dish 24 may be molded of polystyrene or other plastic material. The bottom cover 82, valve 128 and retainer preferably are made of ABS or similar material that possesses some flexibility as these parts are subject to some impact. While these materials are preferred, it should be appreciated that they do not limit the scope of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A pet drinking fountain comprising a base and a water supply tank having a closed generally dome-shaped top disposed on the base and extending upwardly therefrom,
   a water collection area in the base disposed beneath the dome-shaped tank,
   a channel in the base substantially surrounding the bottom portion of the dome-shaped tank top,
   a water pump disposed in the collection area and connected to a duct that extends to the outer surface of the top of the tank and directs water in the area to the upper portion of the tank causing water from the duct to spill down essentially unrestricted over the outer surface of the dome-shaped top of the tank and into the channel, a discharge passage in the lower portion of the tank top communicating with the collection area for enabling water in the tank to flow to the collection area of the base when the water in the base falls below a predetermined level, and a drinking container in communication with the channel and the collection area from which pets may drink water directed to it from the channel.

2. A pet drinking fountain as described in claim 1 wherein a filter is mounted in the collection area and filters water in the base before it is drawn into the pump.

3. A pet drinking fountain as described in claim 2 wherein the duct extends from the pump upwardly through the tank to the top of the outer surface of the dome-shaped top.

4. A pet drinking fountain as described in claim 3 wherein a portion of the water discharged at the top of the duct flows directly into the drinking container.

5. A pet drinking fountain as described in claim 1 wherein the pump is continuously driven by an electric motor.

6. A pet drinking fountain as described in claim 1 wherein the dome-shaped top has a smooth outer surface allowing the water to flow smoothly toward the base.

7. A pet drinking fountain as described in claim 1 wherein the drinking container is disposed to the side of the tank.

8. A pet drinking fountain as described in claim 1 wherein a food dish is connected to the base.

9. A pet drinking fountain as described in claim 8 wherein the food dish is adjacent the drinking container.

10. A pet drinking fountain as described in claim 1 wherein access is provided for the pet to the dome-shaped surface of the tank enabling the animal to lap water flowing down the surface or in the drinking container.

11. A device for providing drinking water to pets comprising,
  a base having a tank support and a drinking bowl,
  a water chamber in the base having an inlet connected from the bowl for enabling water in the bowl to pass into the chamber,
  a closed tank disposed on the support and a duct extending from the chamber to the top of the outer surface of the tank, said tank outer surface sloping downwardly about the periphery of the tank enabling water to flow down from the top about the periphery of the tank,
  a pump in the base connected to the duct for pumping water from the chamber through the duct discharges the water from the chamber to the top of the tank so that it flows downwardly over substantially the entire outer surface of the top of the tank,
  a gutter about the lower portion of the tank and communicating with the bowl for collecting water flowing down the outer surface thereof and directing it into the bowl,
  a passage in the tank communicating with the chamber and a valve for opening and closing the passage,
  means connected to the valve for opening the passage when the tank is disposed on the base,
  and a sleeve defining the passage and extending into the chamber with the lower portion of the sleeve positioned to be fully submerged in water in the chamber for preventing the flow of water from the tank into the chamber when said end is fully submerged and allowing water to flow from the tank to the chamber when a portion of the lower end of the sleeve is above the surface of the water in the chamber enabling air to flow into the tank.

12. A device for providing drinking water to pets as described in claim 11 wherein the duct extends through the tank.

13. A device for providing drinking water to pets comprising,
  a bowl for receiving water and from which pets may drink,
  a water circulation system including a water chamber separate from the bowl and means enabling water to flow from the bowl to the chamber,
  a reserve water tank for supplying additional water to the system when the water level falls below an established level in the chamber, said tank being dome-shaped and having a substantially smooth dome-shaped top outer surface,
  and pump means in the system having an inlet in the water chamber and an outlet at the top of the tank discharges water from the chamber onto the outer surface of the upper portion of the dome-shaped tank causing water to flow down over substantially the the dome-shaped top outer surface and into the bowl.

14. A device for providing drinking water to pets as described in claim 13 wherein the tank includes the domed top and a removable bottom cover attached to the dome-shaped top for enabling the tank to be filled when the tank is inverted and the cover removed.

15. A device for providing drinking water to pets as described in claim 14 wherein a handle is connected to the dome-shaped top for lifting the tank.

16. A device for providing drinking water to pets as described in claim 15 wherein the handle provides a support for the tank when it is inverted.

17. A device for providing drinking water to pets as described in claim 14 wherein the tank includes valve means for enabling water to flow from the tank to the chamber,
  means responsive to positioning the tank in the system for opening the valve means,
  and means for controlling pressure in the tank for preventing water in the tank flowing out the valve means to the chamber when the valve means is open.

18. A device for providing drinking water to pets as described in claim 17 wherein the pump means is in continuous operation when the tank is in the system.

19. The device as defined in claim 14 wherein a retainer maintains the dome and cover together.

20. The device as defined in claim 19 wherein removal of the retainer separates the dome and cover.

21. A device for providing drinking water to pets as described in claim 13 wherein the circulation system includes a duct connected to the pump and extending through the water tank for carrying water from the chamber to the surface of the dome-shaped top.

22. A pet drinking fountain comprising,
  a base and, a well in the base for collecting water,
  a water tank on the base providing a reservoir of water for the fountain, said tank having a dome shaped top from which pets can lap water flowing down its external surface and a detachable bottom cover,
  a first passage in the bottom cover providing communication between the interior of the tank and the well and a valve associated with the first passage for closing it, the interior of the tank being closed to the ambient pressure when the water in the well closes the first passage,
  an actuator in the base causing the valve to remain open when the tank is placed on the base, said valve allowing ambient pressure to enter the tank when the water falls below a prescribed level to open the first passage thereby causing water in the tank to flow into the well until the water closes said first passage, a duct, operatively independent of the first passage and valve, extending through the tank from the well to the upper external surface of the dome and a pump for directing water in the well upwardly through the duct causing the water to spill onto and spread about the dome surface from which pets can lap water flowing down the dome surface, a channel disposed adjacent the lower portion of and encircling a major portion of the circumference of the dome for collecting water that flows down the surface of the dome, a water dish disposed adjacent the channel into which the channel directs water it collects from the surface of the dome, said dish providing a source of drinking water for pets, and a second passage connecting the dish to the well enabling water to flow into the well when the water in the dish exceeds a prescribed height.

23. A pet drinking fountain as described in claim 22 wherein a food dish is connected to the base.

24. A pet drinking fountain as described in claim 22 wherein the channel is connected to the base.

25. A pet drinking fountain as described in claim 22 wherein the channel is pitched causing water to flow in a prescribed direction into the dish causing the water to circulate in the dish.

26. The pet drinking fountain as defined in claim 22 wherein a retainer operatively associated with the dome and bottom cover for holding the two together, and a seal engaging both the dome and bottom cover.

27. The pet drinking fountain as defined in claim 26 wherein an extractor is operatively associated with the retainer for pushing the dome and cover apart to break the seal.

28. The pet drinking fountain as defined in claim 26 wherein the retainer is attached to the duct and supports the bottom cover.

29. The pet drinking fountain as defined in claim 28 wherein the retainer is threaded onto the duct and moves axially with respect to the dome so as to be removable from the duct when the bottom cover is to be separated from the dome.

30. The pet drinking fountain as defined in claim 29 wherein unscrewing the retainer from the duct forces the bottom cover away from the dome.

31. A pet drinking fountain comprising a base and a generally dome-shaped tank disposed on the base for hold water as a reserve supply for the fountain, a water collection chamber in the base and lower than the dome-shaped tank a duct extending upwardly from the chamber to the external surface of the top of the dome-shaped tank and operatively connecting to a pump and directing water from the chamber onto the external surface of the top of the dome-shaped tank causing the water to flow down over a substantial portion of the external surface so that a pet may lap water flowing down on said surface, and a passage in the dome-shaped tank for discharges water in the dome-shaped tank when the water in the chamber falls below a prescribed level.

32. The pet drinking fountain as described in claim 31 wherein a bowl separate from the chamber collects water that flows down the external surface of the tank and provides another source of water for the pets.

* * * * *